Figure 5:
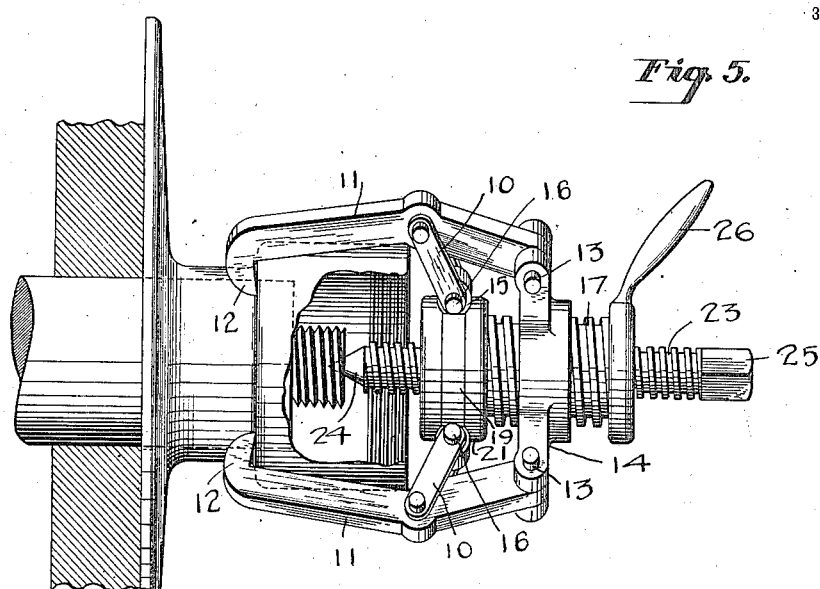

G. A. COLLISON.
WHEEL PULLER.
APPLICATION FILED MAR. 7, 1912.
1,043,400.
Patented Nov. 5, 1912.
3 SHEETS—SHEET 1.
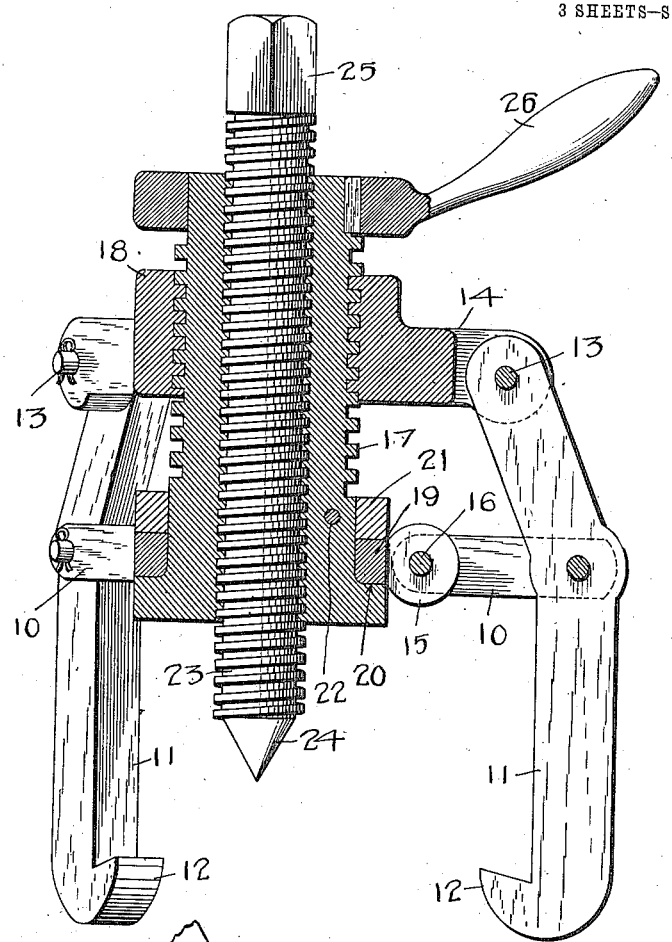
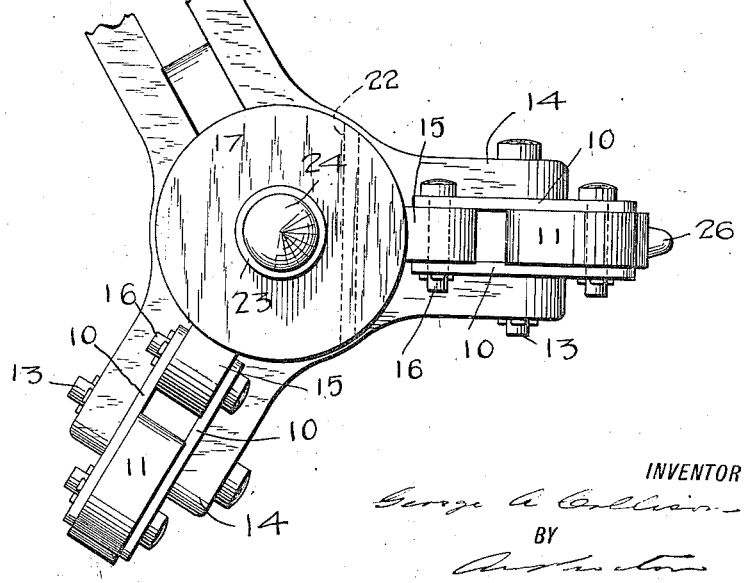
WITNESSES
INVENTOR
BY
ATTORNEY

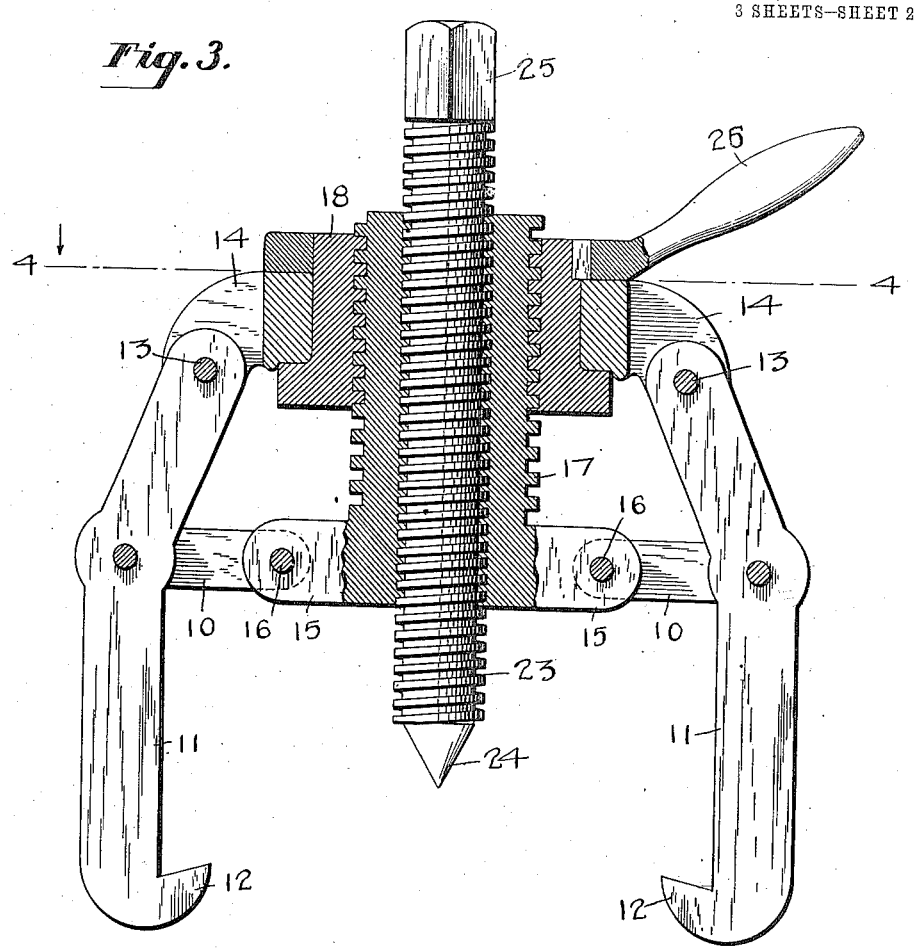
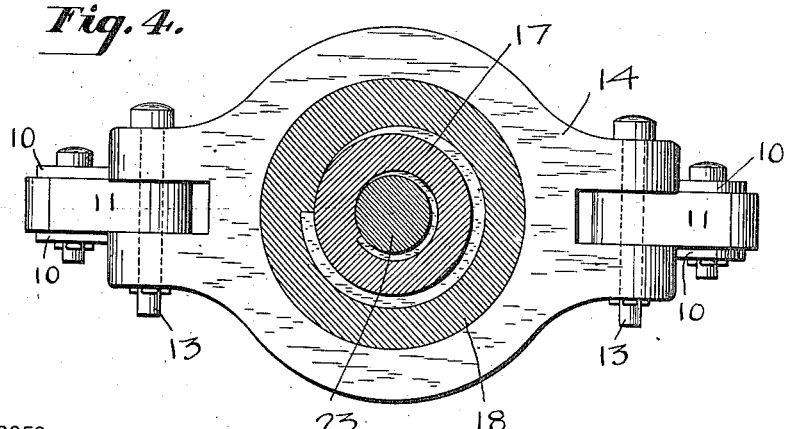

G. A. COLLISON.
WHEEL PULLER.
APPLICATION FILED MAR. 7, 1912.

1,043,400.

Patented Nov. 5, 1912.
3 SHEETS—SHEET 3.

WITNESSES

INVENTOR

BY

ATTORNEY

UNITED STATES PATENT OFFICE.

GEORGE A. COLLISON, OF BURLINGTON, VERMONT.

WHEEL-PULLER.

1,043,400.  Specification of Letters Patent.  Patented Nov. 5, 1912.

Application filed March 7, 1912. Serial No. 682,250.

*To all whom it may concern:*

Be it known that I, GEORGE A. COLLISON, a citizen of the United States, and a resident of Burlington, in the county of Chittenden and State of Vermont, have invented certain new and useful Improvements in Wheel-Pullers, of which the following is a specification.

This invention relates to mechanism for pulling a wheel off a shaft or axle to which such wheel may be secured, and similarly removing propellers from a propeller shaft and similar uses.

Where a wheel is keyed or secured to a shaft it is not permissible to have any loose or sliding fit between the two parts. Steel is elastic and stretches somewhat under the strains of use so that looseness will be developed in even a very accurate fit if such strains are to be imposed. Any looseness in use and under strains, quickly results in wear with augmented looseness. This is particularly true in the case of automobile wheels through which the car is propelled from the rear axles. All such wheels and similar parts are therefore forced with great security onto their shafts, the metal actually being stretched more or less on account of the power with which the parts are driven together. It accordingly becomes a matter of great difficulty to remove such a wheel from its shaft. In the case of an automobile a wheel must frequently be removed, however, and quite often on the road or away from factory facilities, for example when the axles are sprung or damaged, as they frequently are, or the wheels themselves injured.

In order to make it possible to readily remove wheels and similar parts from a shaft, the present invention provides an improved device which is compact and easily portable, strong and durable, easy to manufacture and which is adjustable to any sort of hub on a wheel or similar part, whether the same is truly cylindrical or tapering, or has a bead or flange.

The invention further provides a machine which is adjustable to hubs of widely differing size, but which automatically clings to or embraces the hub by the force or pressure of its own action in pressing against the end of the secured shaft, the degree of clinging pressure on the hub being proportional to the amount of longitudinal force applied to the shaft, having in this detail an action similar to the action of pipe wrenches and similar appliances which have a gripping action proportional to the necessity therefor in use.

With these general and other objects in view the invention consists in the improved implement for removing wheels and similar parts from a shaft, as hereinafter set forth.

Figure 6:
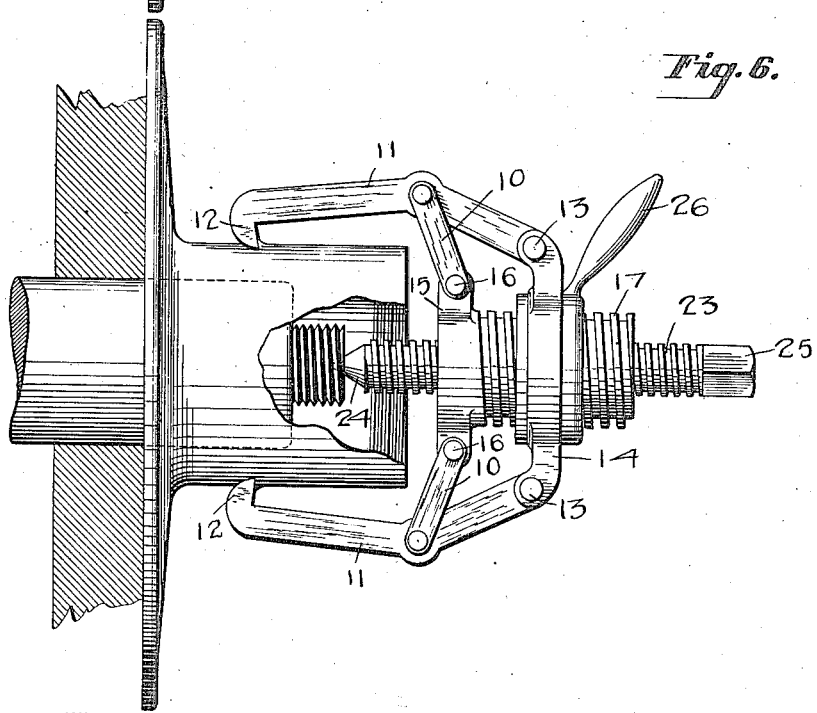

In the drawings,—Figure 1, is a sectional view of a wheel-puller embodying the principles of this invention; Fig. 2, is a bottom plan view of the same; Fig. 3, is a view similar to Fig. 1 showing a modified form of adjustment; Fig. 4, is a section on the line 4—4 of Fig. 3 looking in the direction of the arrow; Fig. 5, is a side elevation of the wheel-puller of Fig. 1 applied to the hub of a wheel, and Fig. 6, is a similar view showing the implement applied to a wheel hub of a slightly different character.

Constructions embodying the invention will include a plurality of jaws for gripping or engaging the surface of the hub of the wheel or similar part, and will further include a centrally projectable member having a longitudinal or axial movement with respect to the jaws. The best constructions will be made with a base having a plurality of adjustable hooks with sharp hook ends constituting jaws for gripping the hub of the wheel or similar part. In order to obtain an adjustment for the hooks, the latter will in this construction be pivoted to the base and extend from the pivot point in a direction along the axis, from which they converge or diverge, more or less, according to the degree of adjustment required. The hooks will further be provided with some holding member or strain support for holding the hooks in their gripping relation on the hub of the wheel. Constructions for this purpose may vary somewhat in practice. In the construction shown in the drawing bifurcated links 10 are attached to bent hooks 11 at the bend thereof between their sharp hook extremities 12 and their pivot points or fulcrums 13 on the base 14. These links 10 are jointed to a supplemental base 15 to which they are flexibly connected at suitable pivot bearings 16. The supplemental base 15 is adjustable toward and from the main base 14, and may be fixed and strained in any position of adjustment. Referring to Figs. 1 and 2 there is shown such an adjustment comprising a screw or threaded sleeve 17 forming part of the supplemental base 15 and passing through a nut 18 constituting or forming part of the base 14. As shown in Figs. 1 and 2 the threaded sleeve 17 has a swivel connection with a ring 19 to which the pivotal eyes or bearing 16 of the supplemental base are attached. It will be observed that the threaded sleeve 17 has a solid end thrust engagement at 20 in the direction where the strains of use will come. The other collar 21 of the swivel connection is pinned or secured in place by any suitable fastening means as a pin 22. The construction of Figs. 3 and 4 is different to this extent that the screw threaded sleeve 17 forming a part of the supplemental base 15 is rigid and in fact integral therewith, while the nut 18 forming part of the main base is swiveled thereto instead of rigid with the latter. The character of the swivel connection is substantially the same and has the same characteristics as that just pointed out in connection with the parts 19, 20, 21 and 22. Within the threaded sleeve 17 there is a forcing or pressure means for which the sleeve constitutes an abutment or strain resistance or strain support. This pressure means will best take the form of a screw 23 passing through the entire length of the threaded sleeve 17 and having a center point 24 at one end, and a head 25 at the other end by which it may be turned through any suitable engaging wrench. In addition to this, the nut 18 and threaded sleeve 17 may be turned with respect to one another as a preliminary adjustment, and for this purpose the threaded sleeve itself is turned in the construction of Fig. 1 by a handle 25, the nut 18 being turned in Fig. 3 by a similar handle 26. The result of turning the nut and screw with reference to one another is to bring the bases 14 and 15 closer toward one another or farther apart from one another.

The action of the appliance will now be shown.

It will be assumed that it is desired to take an automobile wheel off the rear axle. The usual cap screw will of course be removed from the hub and thereafter the handle 26 of the wheel puller is turned until the jaws and hooks 11 separate enough to embrace the wheel hub. A few turns of the handle 25 will then contract the jaws together until their hooked ends 12 cling or bite into the metal at distributed points around the circumference of the hub. In this relation the implement is illustrated in both Figs. 5 and 6. It is now merely necessary to turn the screws 23 by any suitable wrench, which will cause its center point 24 to become embedded in the usual counter sunk center of the shaft, and further rotation of the screw will bear with as much force on the shaft as the resistance of the threaded sleeve 17, or in other words the anchorage or abutment, will permit. The result of this pressure is transmitted to the hooks partly through the links 10 and partly through the inclined pivot ends of the hooks. The former strain is directly toward the center axis and the latter strain is in most cases inclined toward the axis, the inclination increasing with the size of the hub acted upon. Thus the hooks 12 are caused to bite into the metal still more deeply, and when the action is of this character it will be found that the hooks do not tend to give way and scrape along even a parallel surface as shown in Fig. 6. On the contrary, they hold fast to the extent of any force which may be put on them within their limits of strength. Of course where there is a flange or bead on the hub as illustrated in Fig. 5, there is no limit to the amount of pressure available.

While the invention has been particularly described in a practical construction or constructions in such detail as to enable the same to be practically manufactured and used, it is not desirous that the invention be particularly limited to this exact structure or structures since variations may be made within the scope of the appended claims.

What is claimed is:—

1. An implement for removing bodies from shafts to which the same are secured, comprising a base, a plurality of hooks hinged to said base, links for straining said hooks inward to embrace and grip a portion of said body, and pressure means projectable through said base against the shaft to be removed, said pressure means acting to strain the hooks inward.

2. An implement for removing bodies from shafts to which the same are secured, comprising a base, a plurality of hooks distributed symmetrically around said base and hinged thereto, said hooks having sharp hook extremities, links connected to the hooks intermediate of their length for straining said hooks inward to embrace and grip a portion of said body, and pressure means projectable through said base against the shaft to be removed.

3. An implement for removing bodies from shafts to which the same are secured, comprising a base, a plurality of hooks symmetrically distributed around said base, and hinged thereto, a supplemental base, links connected to the hooks intermediate of their length for straining said hooks inward from said supplemental base, means for fixing the separation of said bases at different distances, and pressure means projectable through said last mentioned means against the shaft to be removed.

4. An implement for removing bodies from shafts to which the same are secured, comprising a base, a plurality of hooks symmetrically distributed around said base and having sharp hook extremities adapted to embrace and grip a portion of said body, a supplemental base, links joining said hooks and supplemental base, means for adjusting and fixing the separation of said bases at different distances to strain the hooks inward through said links, and pressure means projectable through said base against the shaft to be removed.

5. An implement for removing bodies from shafts to which the same are secured, comprising a base, a plurality of hooks symmetrically arranged around said base, said hooks having sharp hook extremities adapted to embrace and grip a portion of said body, a supplemental base, links joining an intermediate portion of said hooks with said supplemental base, a threaded sleeve for fixing the separation of said bases at different distances and straining the said links, and a central screw projectable through said sleeve against the shaft to be removed.

6. An implement for removing bodies from shafts to which the same are secured, comprising a base, a plurality of hooks symmetrically distributed around the base and pivoted thereto and diverging from such base symmetrically about a central axis, a supplemental base, links joining intermediate portions of said hooks with said supplemental base, a sleeve having a shoulder supporting the supplementary base, and means for moving said sleeve to strain said bases toward one another, and pressure means projectable through said sleeve against the shaft to be removed.

7. An implement for removing bodies from shafts to which the same are secured, comprising a base, a plurality of bent hooks pivoted to said base, a supplemental base, links joining the bent portions of said hooks with said supplemental base, means for straining the bases toward one another, and pressure means projectable through said last mentioned means against the shaft to be removed.

8. An implement for removing bodies from shafts to which the same are secured, comprising a base, a plurality of hooks symmetrically distributed around the base and pivoted thereto, a supplemental base, links joining said hooks and said supplemental base, a threaded sleeve for straining said bases toward one another, a handle by which the same is actuated, and pressure means projectable through said sleeve against the shaft to be removed.

9. An implement for removing bodies from shafts to which the same are secured, comprising a base, bent hooks symmetrically grouped around said base and pivoted thereto, said hooks diverging from said base symmetrically about a common axis, a supplemental base, straddle links joining the bent portions of said hooks with said supplemental base, a threaded sleeve, means for actuating said sleeve to separate and draw the bases toward one another, and pressure means projectable through said sleeve against the shafts to be removed.

Signed at Burlington, in the county of Chittenden and State of Vermont this 8th day of February A. D. 1912.

GEORGE A. COLLISON.

Witnesses:
S. A. NOTT,
CLAUDE D. GRATON.